Figure 1:
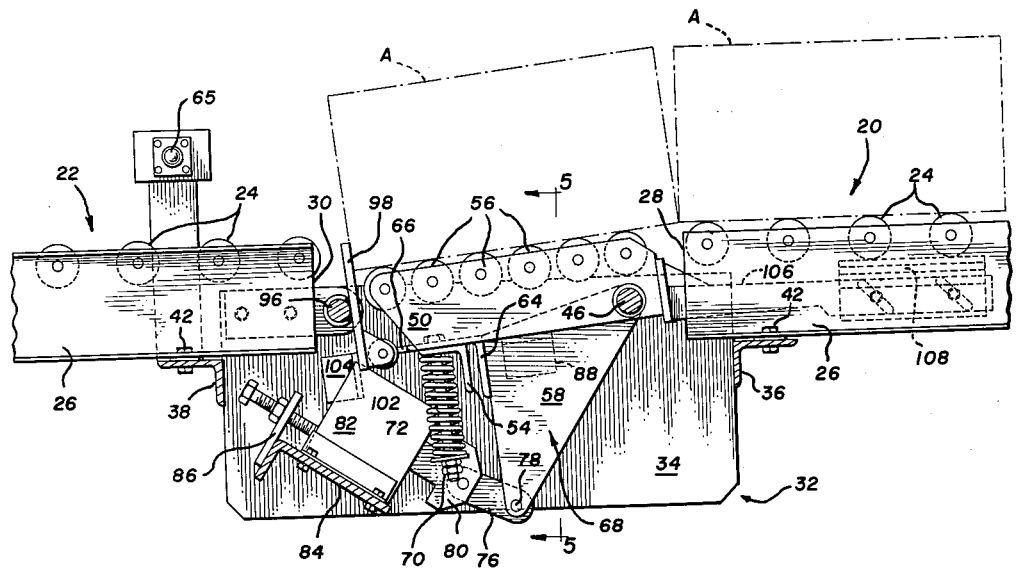

Oct. 16, 1962 — D. A. KUBAT — 3,058,564
ARTICLE HANDLING APPARATUS
Filed April 28, 1960 — 3 Sheets-Sheet 1

INVENTOR.
DONALD A. KUBAT

ATTORNEYS

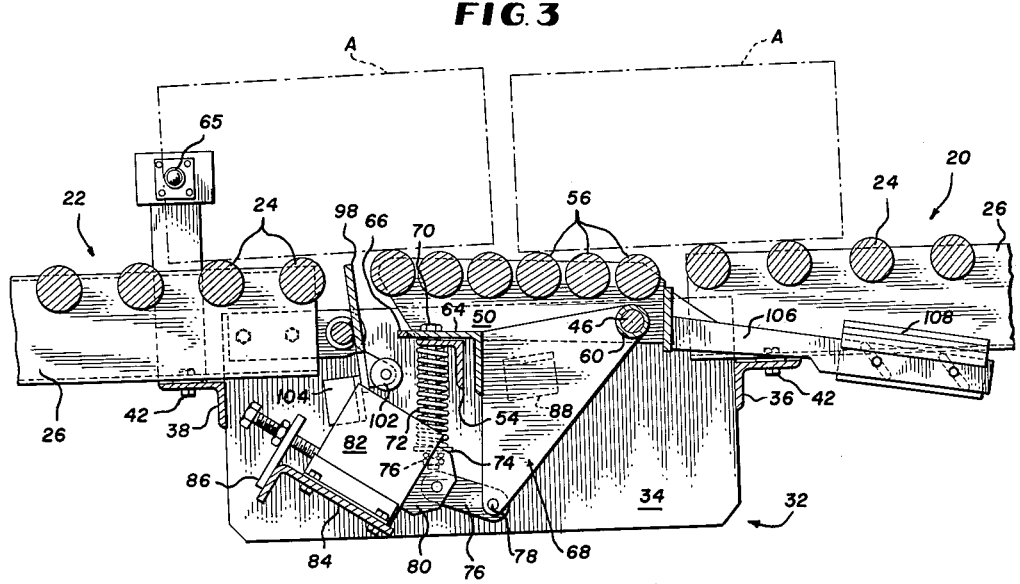

Oct. 16, 1962 D. A. KUBAT 3,058,564
ARTICLE HANDLING APPARATUS
Filed April 28, 1960 3 Sheets-Sheet 3
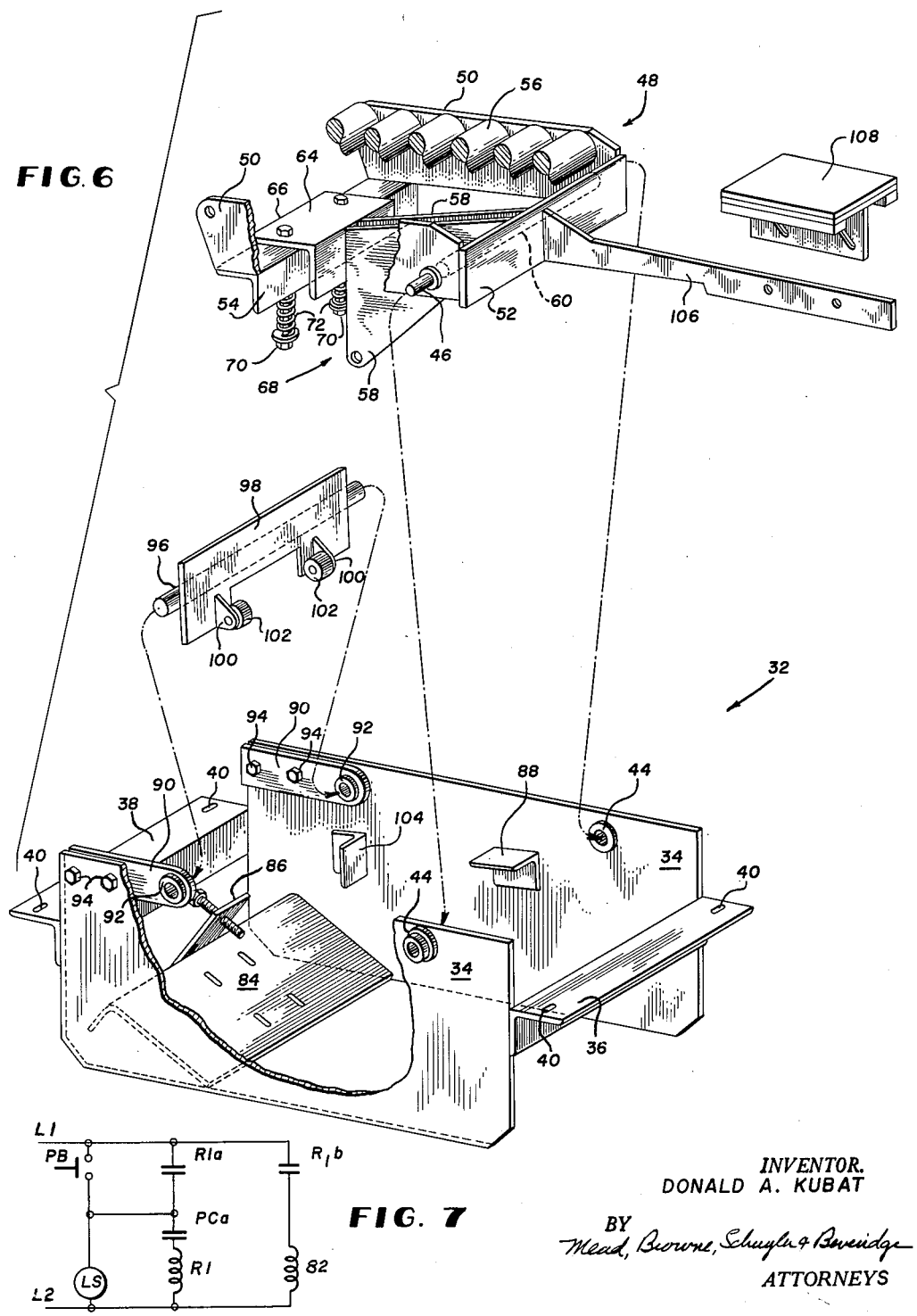
INVENTOR.
DONALD A. KUBAT
BY
Mead, Browne, Schuyler & Beveridge
ATTORNEYS

United States Patent Office 3,058,564
Patented Oct. 16, 1962

3,058,564
ARTICLE HANDLING APPARATUS
Donald A. Kubat, Oakland, Calif., assignor to Mathews Conveyer Company, Ellwood City, Pa., a corporation of Pennsylvania
Filed Apr. 28, 1960, Ser. No. 25,419
12 Claims. (Cl. 193—35)

This invention relates to article handling apparatus and more particularly to escapement mechanisms adapted to release or dispense selected numbers of articles from a storage conveyer as in warehouse systems or the like.

The invention finds particular utility in warehousing operations wherein stocks of articles are stored upon storage conveyers which are usually arranged to feed into a main trunk conveyer which conveys the articles to a central station. In many cases, the storage conveyers include an escapement mechanism which may be remotely controlled from the central station so that the operator may release selected numbers of articles from selected storage conveyers to the main trunk conveyer to assemble individual orders. Such systems are particularly adapted for handling articles such as cases of canned goods or the like.

Since such systems become more economically feasible with larger scale operations, the storage conveyers are frequently of substantial length and will normally hold a relatively large number of articles in storage. In most cases, the storage conveyers are in the form of a gravity conveyer whose conveying surface is formed of freely rotatable rollers or wheels. The escapement mechanisms employed on conveyers of this type must be of sturdy and positive acting construction for several reasons. First, when a relatively long gravity storage line is substantially filled, the gravitational forces urging the articles downwardly along the gravity conveyer exert a substantial force or pressure against the stop member of the escapement mechanism. Second, when an article is released from a storage line, the momentum acquired by the relatively large mass of articles in moving down one notch exerts a substantial impact against the stop. This impacting action likewise occurs when the storage line is being initially filled, since the first articles placed on the line build up momentum as they travel the entire length of the conveyer. In addition, when the storage line is relatively long, the leading article in the line is held against the stop member of the escapement mechanism by a substantial force, thus posing problems in disengaging the article from the stop member. Because of the relatively large forces exerted against the stop member, it is highly desirable that the stop member of the positive acting type in order to minimize the possibilities of articles "riding through" the stop.

It is a primary object of the invention to provide an escapement mechanism for use in systems of the type described above wherein the pressure exerted against a positive acting stop member by a line of stored articles may be employed to assist the escapement mechanism in releasing an article from the storage line.

Another object of the invention is to provide an escapement mechanism wherein the line pressure developed by a line of stored articles may be utilized in the operation of the escapement mechanism.

Still another object of the invention is to provide an escapement mechanism for a gravity conveyer system having a positive acting stop whose operation in releasing articles from the escapement mechanism is independent of the magnitude of pressure exerted against the stop by a stored line of articles.

Still another object of the invention is to provide an escapement mechanism for a gravity conveyer system having a positive acting stop wherein line pressure developed by a line of stored articles is utilized in driving the escapement mechanism to its releasing position and in which the entrance of a subsequent article into the escapement mechanism gravitationally restores the mechanism to its article accumulating condition.

Still another object of the invention is to provide an escapement mechanism in accordance with the foregoing objects which may be readily installed in existing conveyer systems with minor structural modification to existing system.

In the achievement of the foregoing, and other objects, an escapement mechanism embodying the present invention includes a tilting frame mounted in the conveyer line for movement between a normal rest position in which the tilting frame defines an article retaining notch or depression in the conveying surface and an elevated position in which the tilting frame defines a portion of a conveying surface of the system to convey articles through the escapement mechanism. When the tilting frame is in its normal or depressed position, the leading end of an article supported upon the frame engages a stop located below the conveying surface of the system. The stop is mounted for pivotal movement about a horizontal axis located below that portion of the stop engaged by the article. A projection on the stop at a location below its axis of movement abuts the tilting frame so that when the tilting frame is in its rest position, the engagement of the abutment on the stop and the tilting frame opposes the pressure exerted by a line of accumulated articles against the stop to prevent pivotal movement of the stop about its axis. When the tilting frame is moved away from its rest position, the abument on the stop moves underneath the tilting frame and the pressure exerted against the stop by the accumulated line of articles is applied upwardly against the tilting frame to assist in moving the tilting frame to its elevating position. Preferably, the abutment between the stop and the tilting frame in the rest position is "on center" or slightly over-center relative to the axis of tilting movement of the tilting frame to achieve a positive action maintaining both stop and tilting frame in their rest positions.

Other objects and features of the invention will become apparent by reference to the following specification taken in conjunction with the accompanying drawings.

Figure 2:
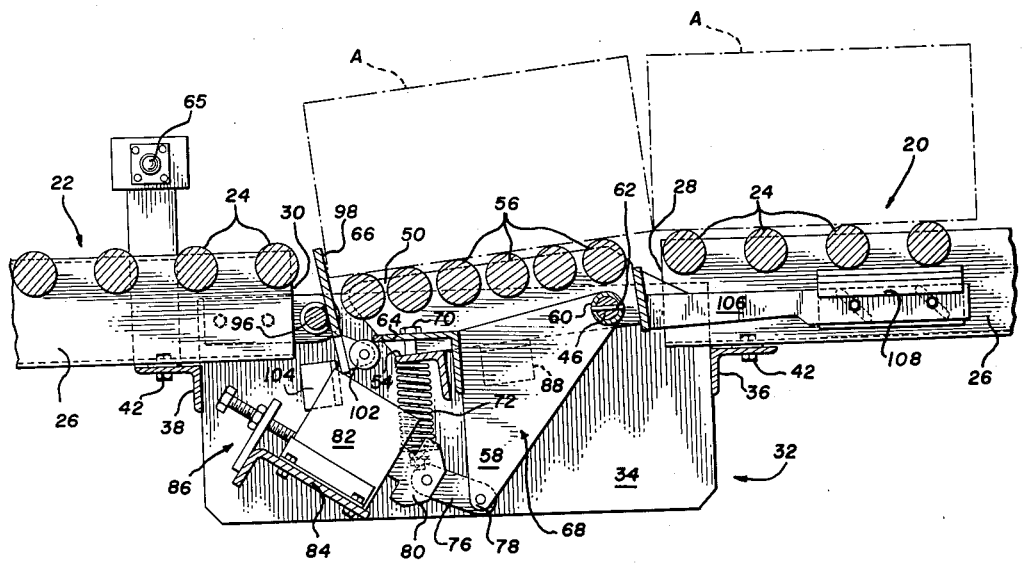

In the drawings:
FIG. 1 is a side elevational view, partially in cross-section, showing an escapement mechanism embodying the invention in its normal article accumulating position;
FIG. 2 is a cross-sectional view taken approximately on the longitudinal center line of the structure of FIG. 1 showing the escapement mechanism during an initial stage of movement away from the normal rest position of FIG. 1;
FIG. 3 is a cross-sectional view similar to FIG. 2 showing the escapement mechanism in its elevated position;
FIG. 4 is a top plan view of the escapement mechanism with certain parts broken away;
FIG. 5 is a transverse cross-sectional view of the escapement mechanism taken on the line 5—5 of FIG. 1;
FIG. 6 is an exploded perspective view of the escapement mechanism of FIGS. 1–5 with adjacent portions of the associated conveyer structure omitted; and
FIG. 7 is a schematic diagram of an exemplary electrical control circuit.

In the embodiment shown in the drawings, an escapement mechanism embodying the present invention is shown in combination with a gravity conveyer system which includes an upstream or storage conveyer section designated generally 20 and a downstream or discharge conveyer section designated generally 22. Storage conveyer section 20 and discharge conveyer section 22 are gravity conveyers of conventional construction in which the conveying surface is defined by a plurality of conveying rollers 24 mounted for free rotation between spaced side rails 26. Side rails 26 are in turn fixedly mounted upon a suitable stationary support frame (not shown) inclined downwardly to the left in FIGS. 1–3 so that articles placed upon rollers 24 are gravitationally conveyed from right to left in FIGS. 1–3. Conveyer sections 20 and 22 are supported in spaced longitudinal alignment from each other so that the discharge end 28 of upstream or storage section 20 is longitudinally spaced from the receiving end 30 of the downstream or discharge conveyer 22 by a distance slightly greater than the conveying length of articles A handled on the conveyers.

The escapement mechanism is designated generally at 32 and is mounted upon and extends between the adjacent ends of conveyer sections 20 and 22. Escapement mechanism 32 includes a pair of spaced vertical side plates 34 which are joined at each end by transversely extending angle members 36 and 38 rigidly fixed to side plates 34 as by welding. The horizontal webs of angle members 36 and 38 are bored as at 40 (FIG. 6) to permit escapement mechanism 32 to be supported from side rails 26 of the adjacent conveyor sections 20 and 22 by nut and bolt assemblies 42 passing through the lower webs of the respective side rails 26.

Referring now to FIG. 6, a first pair of aligned bushings 44 are mounted in the respective side plates 34 to support a shaft 46 for free rotation in side plates 34 about a horizontal axis extending transversely across the rearward ends of plates 34. Shaft 46, when supported in bearings 44, defines a pivotal axis about which a tilting frame designated generally 48 may pivot between side plates 34. Tilting frame 48 is a relatively short roller conveyer section and includes a pair of spaced side plates 50 which are rigidly interconnected at their rearward ends by a transverse cross plate 52 and connected at their forward ends by an angle 54 secured, as by welding, to the lower surface at the forward end of side plates 50. A plurality of transversely extending conveyer rollers 56 are supported by side plates 50 for free rotation relative to side plates 50. A pair of aligned bushings 57 are mounted in side plates 50 to rotatably receive shaft 46.

In addition to defining a pivotal support for tilting frame 48, shaft 46 also pivotally supports an actuating frame 68 which includes a pair of triangular vertical plates 58 rigidly secured at their upper rear corners to a sleeve 60 which is pinned as by pin 62 (FIG. 2) to shaft 46 for rotation with the shaft. An angle member 64 having webs somewhat larger than the webs of angle member 54 is welded to the upper front corner of triangular plates 58. A hardened steel strip 66 is welded across the front edge of the upper web of angle member 64 for purposes to be described below.

Actuating frame 68 is resiliently coupled to tilting frame 48 by a spring bolt assembly which includes a pair of bolts 70 having shanks passing freely through aligned bores in the vertical overlapping webs of angle members 54 and 64. The heads of bolt 70 are engaged above the web of angle member 64 and compression springs 72 are seated between the lower surface of the web of angle member 54 and a washer 74 retained on the shank of bolt 70 by a dual locking nut 76. Thus, compression spring 72 normally biases the vertically overlapping webs of angle members 54 and 64 against each other but, as best seen in FIG. 2, relative pivotal movement may occur between tilting frame 48 and actuating frame 68 about shaft 46 against the compressive force exerted by springs 72.

A link 76 is connected by a pivot pin 78 to the lower ends of triangular plates 58 to couple actuating frame 68 to the armature 80 of a pull solenoid 82 fixedly mounted upon a cross plate 84 welded between side plates 34 of the escapement mechanism. Since the rest position of actuating frame 68 is somewhat critical, an adjustment screw assembly 86 is mounted upon plate 84 to accurately locate solenoid 82.

To accurately locate the escapement mechanism in its normal or rest position shown in FIG. 1, a pad 88 is welded to side plate 34 to support and locate tilting frame 48 in its normal rest position, pad 88 also establishing the rest position of actuating frame 68 by the overlapping engagement between angle member 64 of frame 68 and angle member 54 of frame 48.

At the forward end of side plates 34, a pair of blocks 90 having bearing bushings 92 are secured to the opposed inner side surfaces of plates 34 as by bolts 94. Bushings 92 rotatably support a shaft 96 for free rotation relative to plates 34 near the forward end of the escapement mechanism. A stop plate 98 is rigidly secured to shaft 96 as by welding shaft 96 along the approximate longitudinal center line of stop plate 98. At the lower side of plate 98, a pair of forwardly projecting ears 100 rotatably support a pair of rollers 102 on plate 98 for free rotation about a common horizontal axis parallel to the axis of rotation of shaft 96. A pad 104 is welded to side plate 34 at a location to engage stop plate 98 below the axis of shaft 96 to establish the normal rest position of the stop plate. The configuration of the stop plate is such that it is ordinarily gravitationally biased against pad 104.

In certain instances, it is desirable to slow down articles approaching the escapement mechanism, and for this purpose tilting frame 48 may be constructed with a brake assembly which consists of an arm 106 welded to and projecting rearwardly from cross plate 52. At the outer end of arm 106, a brake pad assembly 108 is mounted upon the arm to frictionally engage the lower surfaces of a pair of conveying rollers 24 on storage conveyer section 20 when tilting frame 48 is in its normal position shown in FIG. 1. Brake pad assembly 108 may be somewhat resilient in construction.

Referring now especially to FIG. 1, when pull solenoid 82 is not energized, its armature 80 is in the fully extended position shown in FIG. 1 and tilting frame 48 is inclined downwardly from the conveying surface of conveyer section 20 to a location below the receiver end of conveyer 22 to define an article retaining notch or depression in the conveying surface of the system. Stop plate 98 projects upwardly from shaft 96 to a location where the leading article supported upon tilting frame 48 abuts or engages stop plate 98 at a location above the axis of shaft 96. Since storage conveyer 20 is a gravity conveyer, the gravitational forces exerted upon the line of accumulated articles supported on conveyer 20 urge the articles to move toward the left in FIG. 1 and hence a substantial force is exerted against stop plate 98 urging plate 98 in counterclockwise pivotal movement about the axis of shaft 96. This force exerted by the stored line of articles is conventionally referred to as "line pressure." To prevent movement of stop plate 98 in this situation, pad 88 establishes the rest position of tilting frame 48, and hence actuating plate 68, at a position such that rollers 102 on stop plate 98 engage hardened steel strip 66 extending across the forward edge of angle member 64 of actuating frame 68. The point at which strip 66 engages the peripheries of rollers 102 when the stop and actuating frame are in their respective rest positions shown in FIG. 1 is selected so that the line pressure exerted against stop plate 98 is applied to actuating frame 68 along a line passing through or slightly below the axis of shaft 46. If this force is so directed as to pass directly through the axis of shaft 46, the force exerts no tendency to pivot actuating frame 68 in either direction about shaft 46. If the line in which the force is applied passes below the axis of shaft 46, its tendency is to pivot actuating frame 68 in a counterclockwise direction as viewed in FIG. 1, movement of actuating frame 68 in this direction being positively prevented by pad 88. Thus, the engagement between roller 102 and strip 66 exerts a positive force to prevent movement of stop 98 from the FIG. 1 position as long as strip 66 contacts roller 102 at a location so that the line pressure force is applied to strip 66 in a direction passing through or below the axis of shaft 46.

During the initial movement of actuating frame 68 upwardly, as to the FIG. 2 position, the point of contact between strip 66 and roller 102 is modified so that the line pressure force is now transmitted to actuating frame 68 along a line passing above the axis of shaft 46, thus becoming operable to forcibly pivot actuating frame 68 upwardly in a clockwise direction about shaft 46.

Movement of the escapement mechanism to its article releasing position is accomplished by an electrical control circuit of the type schematically shown in FIG. 7. With the escapement mechanism in its normal rest position shown in FIG. 1, armature 80 of solenoid 82 is in its fully extended position. The operator manually depresses a push button PB (FIG. 7) which completes a circuit across supply lines $L_1$ and $L_2$ through the light source LS which projects a light beam across discharge conveyer 22 to energize a photocell PC (FIG. 4) thereby closing a set of photocell control contacts PCa in FIG. 7 to energize a control relay $R_1$. Relay $R_1$, when energized, closes contacts $R_1a$ which by-pass contacts PB to permit the push button to be released while maintaining the light source and relay $R_1$ energized. Relay $R_1$, when energized, also closes a set of contacts $R_1b$ which are employed to energize the coil of solenoid 82 which retracts its armature 80.

Retraction of armature 80 drives actuating frame 68 in clockwise movement about shaft 46 from the position shown in FIG. 1. By the time actuating frame 68 has reached the position of FIG. 2, the line pressure exerted against stop 98 by the accumulated line of articles is applied to actuating frame 68 to assist solenoid 82 in elevating the actuating frame about the axis of shaft 46. The initial clockwise movement of actuating frame 68 does not begin to elevate tilting frame 48 until the compressive force exerted by springs 72 is sufficient to overcome the weight of tilting frame 48 and the article supported upon the tilting frame.

Eventually the compressive force exerted by springs 72 overcomes the downward force of the tilting frame and the article supported upon the frame and tilting frame 48 is elevated to the position shown in FIG. 3 so that the leading article may pass above stop 98 onto the conveying surface of discharge conveyer 22. The leading article then passes by gravity onto discharge conveyer 22 and the accumulated line of articles on storage conveyer 20 likewise begin to move downward to the left as viewed in FIG. 3. Light source LS and photocell PC are located downstream along discharge conveyer 22 a sufficient distance so that the leading article is fully supported upon discharge conveyer 22 before it breaks the beam of light between light source LS and photocell PC. When the light beam is broken, photocell contacts PCa of FIG. 9 open to de-energize relay $R_1$, thus opening contacts $R_1a$ and $R_1b$ to respectively de-energize the light source and solenoid 82.

As indicated in FIG. 3, stop plate 98 is gravitationally returned to its original position as soon as the leading article is elevated clear of the plate. When relay 82 is de-energized, both actuating frame 68 and tilting frame 48 are returned to their FIG. 1 position by the action of gravity, assisted by the weight of the next article in line moving onto tilting frame 48. As tilting frame 48 arrives at its rest position, brake pad 108 engages the rollers of storage conveyer 20 to apply a braking action against the line of accumulated articles moving to the left on storage conveyer 20. Tilting frame 48 and actuating frame 68 arrive at their rest position somewhat before the article moving on to tilting frame 48 engages stop 98, hence the stop is positively locked against movement under the impact of the accumulated line of articles.

While I have described but one embodiment of my invention it will be apparent to those skilled in the art that the disclosed embodiment may be modified. Therefore, the foregoing description is to be considered exemplary rather than limiting and the true scope of my invention is that defined in the following claims.

What is claimed is:

1. Article handling apparatus comprising a gravity conveyer adapted to convey articles in line along a conveying surface, a stop extending transversely across said conveyer at a location below said conveying surface, a tilting section on said conveyer extending upstream of said conveyer from said stop, means supporting said tilting section on said conveyer for movement between an elevated position wherein said tilting section defines a portion of said conveying surface to convey articles above said stop and a depressed position wherein said tilting section is inclined downwardly from said conveying surface to convey an article into engagement with said stop to thereby accumulate a line of articles upon said conveyer, and means on said stop operable upon movement of said tilting section upwardly from said depressed position to apply pressure exerted against said stop by an accumulated line of articles to said tilting section to urge said tilting section toward said elevated position.

2. Article handling apparatus comprising a gravity conveyer adapted to convey articles in line along a conveying surface, a stop extending transversely across said conveyer at a location below said conveying surface, means supporting said stop upon said conveyer for pivotal movement about an axis extending transversely across said conveyer, a tilting section on said conveyer extending upstream of said conveyer from said stop, means supporting said tilting section upon said conveyer for movement between an elevated position wherein said tilting section defines a portion of said conveying surface to convey articles above said stop and a depressed position wherein said tilting section is inclined downwardly from said conveying surface toward said stop to convey an article into engagement with said stop at a location above the axis of pivotal movement of said stop to thereby accumulate a line of articles on said conveyer, means on said stop below the axis of pivotal movement of said stop engageable with cooperating means on said tilting section to apply pressure exerted against said stop by an accumulated line of articles to said tilting section to urge said tilting section toward said elevated position upon movement of said section away from said depressed position.

3. Article handling apparatus as defined in claim 2 wherein said means on said stop below the axis of pivotal movement engage said cooperating means on said tilting section in said rest position to apply the pressure exerted by said line of articles to said tilting section in a direction maintaining said tilting section in said rest position, and a limit stop for preventing tilting movement of said tilting section below said rest position.

4. Article handling apparatus comprising a gravity conveyer adapted to convey articles in line along a conveying surface, a stop plate extending transversely across said conveyer at a location below said conveying surface, means supporting said stop plate upon said conveyer for pivotal movement about an axis extending transversely across said conveyer, a tilting section on said conveyer extending upstream of said conveyer from said stop, means supporting said tilting section for movement between an elevated position wherein said section defines a portion of said conveying surface to convey articles above said stop plate and a depressed position wherein said tilting section is inclined downwardly from said conveying surface toward the axis of said stop plate to convey an article into engagement with said stop plate at a location above the axis of said stop plate to thereby accumulate a line of articles on said conveyer, abutment means on said stop plate at a location below said axis of pivotal movement engageable with said tilting section when said tilting section is in said depressed position to oppose the pressure exerted against said stop plate by an accumulated line of articles to hold said stop plate against pivotal movement about said axis, and elevating means for moving said tilting section to said elevated position, said abutment means being operable upon movement of said tilting section from said depressed position to apply pressure exerted against said stop plate by an accumulated line of articles upwardly against said tilting section to assist said elevating means in moving said tilting section toward said elevated position.

5. For use in combination with a storage conveyer adapted to gravitationally convey articles in line to the discharge end thereof and a discharge conveyer having a receiving end located adjacent the discharge end of said storage conveyer; an escapement mechanism comprising a tilting conveyer extending from the discharge end of said storage conveyer to the receiving end of said discharge conveyer, means supporting said tilting conveyer for tilting movement between an elevated position wherein said tilting conveyer defines a conveying surface for transferring articles from said storage conveyer to said discharge conveyer and a depressed rest position wherein said tilting conveyer is inclined downwardly from said storage conveyer to a location below the receiving end of said discharge conveyer, a stop plate movably mounted below the receiving end of said discharge conveyer at a location to be engaged by the leading article on said tilting conveyer when said tilting conveyer is in said rest position to thereby accumulate a line of articles on said storage conveyer, elevating means actuable to elevate said tilting conveyer from said rest position to said elevated position, and pressure transmitting means on said stop plate operable upon movement of said tilting conveyer from said rest position to apply the pressure exerted against said stop plate by an accumulated line of articles to said tilting conveyer to assist said elevating means in moving said tilting conveyer to said elevated position.

6. For use in combination with a storage conveyer adapted to gravitationally convey articles in line to the discharge end thereof and a discharge conveyer having a receiving end located adjacent the discharge end of said storage conveyer; an escapement mechanism comprising a tilting conveyer extending from the discharge end of said storage conveyer to the receiving end of said discharge conveyer, means supporting said tilting conveyer for tilting movement between an elevated position wherein said tilting conveyer defines a conveying surface for transferring articles from said storage conveyer to said discharge conveyer and a depressed rest position wherein said tilting conveyer is inclined downwardly from said storage conveyer to a location below the receiving end of said discharge conveyer, a stop plate located below the receiving end of said discharge conveyer to be engaged by the leading article on said tilting conveyer when said tilting conveyer is in said rest position to thereby accumulate a line of articles on said storage conveyer, means supporting said stop plate for pivotal movement about an axis extending transversely of said tilting conveyer below the portion of said stop plate engaged by said leading article, elevating means actuable to elevate said tilting conveyer from said rest position to said elevated position, pressure transmitting means on said stop plate at a location below said axis, and abutment means on said tilting conveyer engageable with said pressure transmitting means when said tilting conveyer is in said rest position to prevent pivotal movement of said stop plate about said axis induced by the pressure of the line of accumulated articles against said stop plate and operable upon movement of said tilting conveyer from said rest position to apply the pressure exerted against said stop plate by the accumulated line of articles to assist said elevating means in moving said tilting conveyer to said elevated position.

7. For use in combination with a storage conveyer adapted to gravitationally convey articles in line to the discharge end thereof and a discharge conveyer having a receiving end located adjacent the discharge end of said storage conveyer; an escapement mechanism comprising a tilting conveyer extending from the discharge end of said storage conveyer to the receiving end of said discharge conveyer, means supporting said tilting conveyer for tilting movement between an elevated position wherein said tilting conveyer defines a conveying surface for conveying articles from said storage conveyer to said discharge conveyer and a depressed rest position wherein said tilting conveyer is inclined downwardly from said storage conveyer to a location below the receiving end of said discharge conveyer, a stop plate movably mounted below the receiving end of said discharge conveyer to be engaged by the leading article on said tilting conveyer when said tilting conveyer is in said rest position to thereby accumulate a line of articles on said storage conveyer, elevating means actuable to elevate said tilting conveyer from said rest position to said elevated position, means for actuating said elevating means, pressure transmitting means on said stop plate operable upon movement of said tilting conveyer from said rest position to apply the pressure exerted against said stop plate by the accumulated line of articles to said tilting conveyer to assist said elevating means in moving said tilting conveyer to said elevated position, and means on said discharge conveyer operable upon movement of an article from said tilting conveyer to said discharge conveyer for de-actuating said elevating means to permit said tilting conveyer to return to said rest position.

8. An escapement mechanism as defined in claim 7 including means supporting said stop plate for pivotal movement about an axis extending transversely across said tilting conveyer at a location above said pressure transmitting means and below the portion of said stop plate engaged by said leading article, an abutment means on said tilting conveyer engageable with said pressure transmitting means, said abutment means on said tilting conveyer engaging said pressure transmitting means at a location wherein the pressure transmitted by said pressure transmitting means acts to maintain said tilting conveyer in said rest position and is applied to said tilting conveyer to urge said tilting conveyer toward said elevated position upon a predetermined movement of said tilting conveyer away from said rest position.

9. An escapement mechanism operable to selectively release articles from a storage conveyer, said mechanism comprising a conveyer frame having a plurality of rotatable elements supported thereon defining a conveying surface adapted to convey articles longitudinally of said conveyer frame, a fixed frame supporting said conveyer frame for pivotal movement about a horizontal first axis extending transversely of said conveyer frame at one end thereof, a stop supported on said fixed frame for pivotal movement about a second axis parallel to said first axis at a location adjacent the other end of said conveyer frame, means for locating said conveyer frame in a rest position wherein said conveying surface is tilted downwardly from said first axis toward said stop to locate an article on the conveying surface of said conveyer frame in engagement with said stop above said second axis, first abutment means mounted on said stop at a location below said second axis, second abutment means on said conveyer frame at said other end thereof engageable with said first abutment means when said conveyer frame is in said rest position to hold said stop against pivotal movement about said second axis induced by the pressure of an article on the conveying surface of said conveying frame against said stop, and means for pivoting said conveyer frame upwardly about said first axis to disengage the last mentioned article from said stop.

10. An escapement mechanism operable to selectively release articles from a storage conveyer, said mechanism comprising a conveyor frame having a plurality of rotatable elements thereon defining a conveying surface adapted to convey articles longitudinally of said conveyer frame, a fixed frame supporting said conveyer frame for pivotal movement about a horizontal first axis extending transversely of said conveyer frame at one end thereof, a stop supported on said fixed frame for pivotal movement about a second axis parallel to said first axis at a location adjacent the other end of said conveyer frame, means for locating said conveyer frame in a rest position wherein said conveyer frame is tilted downwardly from said first axis toward said stop to locate an article on the conveying surface of said conveyer frame in engagement with said stop at a location about said second axis whereby said article is gravitationally urged against said stop to induce pivotal movement against said stop about said second axis in a first direction, cooperating abutment means on said conveyer frame and said stop operable when said conveyer frame is in said rest position to positively prevent pivotal movement of said stop in said first direction and operable upon movement of said conveyer frame upwardly from said rest position to resist pivotal movement of said stop in said first direction whereby the pressure exerted against said stop by said article is applied to said conveyer frame to urge said conveyer frame upwardly about said first axis, and means for driving said conveyer frame in pivotal movement upwardly about said first axis to disengage said article from said stop.

11. Article handling apparatus comprising a gravity conveyer adapted to convey articles in line along a conveying surface, a stop extending transversely across said conveyer at a location below said conveying surface, a tilting section upon said conveyer extending upstream of said conveyer from said stop, means supporting said tilting section on said conveyer for movement between an elevated position wherein said tilting section defines a portion of said conveying surface to convey articles above said stop and a depressed position wherein said tilting section is inclined downwardly from said conveying surface to convey an article into engagement with said stop to thereby accumulate a line of articles upon said conveyer, means supporting said stop upon said conveyer for movement in response to the pressure exerted against said stop by an accumulated line of articles, actuating means on said conveyer movable between a rest position and an actuated position, means coupling said actuating means to said tilting section to drive said tilting section from said depressed position to said elevated position upon movement of said actuating means from said rest position to said actuated position, and means on said stop engageable with said actuating means to prevent movement of said stop in response to the pressure exerted thereon by a line of accumulated articles when said actuating means is in said rest position and to apply the aforementioned pressure to urge said actuating means toward said actuated position upon movement of said actuating means from said rest position.

12. Article handling apparatus comprising a gravity conveyer adapted to convey articles in line along a conveying surface, a stop extending transversely across said conveyer at a location below said conveying surface, a tilting section on said conveyer extending upstream of said conveyer from said stop, means supporting said tilting section on said conveyer for pivotal movement about a horizontal axis extending transversely across said conveyer adjacent the upstream end of said tilting section, means normally locating said tilting section in a depressed position wherein said tilting section is inclined downwardly from its upstream end to convey an article into engagement with said stop to thereby accumulate a line of articles upon said conveyer, means supporting said stop upon said conveyer for pivotal movement about a second axis parallel to said first axis in response to the pressure exerted against said stop by an accumulated line of articles, an actuating frame mounted upon said conveyer for pivotal movement about said first axis between a rest position and an actuated position, means coupling said actuating means to said tilting section to drive said tilting section from said depressed position to an elevated position upon movement of said actuating means from said rest position to said actuated position, said tilting section defining a portion of said conveying surface when in said elevated position to convey articles above said stop, and means on said stop at a location below said second axis engageable with said actuating means to apply the pressure exerted against said stop by an accumulated line of articles in a direction urging said actuating means toward said actuated position.

References Cited in the file of this patent
FOREIGN PATENTS
269,930   Germany _____ Feb. 3, 1914